US012576732B2

(12) United States Patent
Li et al.

(10) Patent No.: US 12,576,732 B2
(45) Date of Patent: Mar. 17, 2026

(54) POWER TRANSMISSION BETWEEN ELECTRIC VEHICLE BATTERY AND ALTERNATING-CURRENT POWER SYSTEM

(71) Applicant: Rivian IP Holdings, LLC, Plymouth, MI (US)

(72) Inventors: Ming Li, Torrance, CA (US); Lixiang Wei, Irvine, CA (US); Steven Schulz, Torrance, CA (US); Puneeth Kumar Srikanta Murthy, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 651 days.

(21) Appl. No.: 18/062,880

(22) Filed: Dec. 7, 2022

(65) Prior Publication Data

US 2024/0190271 A1     Jun. 13, 2024

(51) Int. Cl.
| | |
|---|---|
| B60L 53/10 | (2019.01) |
| H02J 7/34 | (2006.01) |

(52) U.S. Cl.
CPC ............... B60L 53/11 (2019.02); H02J 7/345 (2013.01)

(58) Field of Classification Search
CPC ........ B60L 53/11; B60L 3/0092; B60L 50/64; B60L 50/66; B60L 53/14; B60L 53/31; B60L 53/51; B60L 53/53; B60L 55/00; B60L 58/26; H02J 7/345; H02J 2310/48; H02J 3/322; H02M 3/07
See application file for complete search history.

(56) References Cited

U.S. PATENT DOCUMENTS

| | | | | |
|---|---|---|---|---|
| 6,787,933 | B2 * | 9/2004 | Claude ................... | H02P 9/307 |
| | | | | 322/27 |
| 9,344,082 | B2 * | 5/2016 | Shen ....................... | H03K 17/73 |
| 10,730,396 | B2 * | 8/2020 | Stanfield ................. | B60L 53/11 |
| 10,771,001 | B2 * | 9/2020 | Smolenaers ............. | H02P 25/22 |
| 10,998,824 | B2 * | 5/2021 | Ishibashi ........... | H02M 3/33584 |
| 11,173,858 | B2 * | 11/2021 | Furukawa ............. | B60L 15/007 |
| 11,710,973 | B2 * | 7/2023 | Kersey ................... | H02J 7/1423 |
| | | | | 320/112 |
| 2003/0015873 | A1 * | 1/2003 | Khalizadeh ............. | H02P 9/307 |
| | | | | 290/7 |

(Continued)

FOREIGN PATENT DOCUMENTS

| | | | | |
|---|---|---|---|---|
| CA | 2997565 A1 * | 3/2017 | ................ | H02J 7/02 |
| CN | 105098941 A * | 11/2015 | ................ | H02J 7/02 |

(Continued)

OTHER PUBLICATIONS

Electric Vehicle-to-Grid (V2G) Technologies: Impact on the Power Grid and Battery (Year: 2022).*

(Continued)

*Primary Examiner* — M Baye Diao
(74) *Attorney, Agent, or Firm* — Foley & Lardner LLP

(57)                ABSTRACT

Aspects of this technical solution can a first direct-current (DC) circuit to couple with a DC battery of an electric vehicle, a capacitor of the first DC circuit configured to charge to a capacitance that satisfies a threshold of activation of a second DC circuit, and the first DC circuit to transmit, in response to a determination that the capacitor satisfies the threshold of activation of the second DC circuit, DC power between the battery of the electric vehicle and the second DC circuit.

13 Claims, 11 Drawing Sheets

(56)          References Cited

U.S. PATENT DOCUMENTS

| | | | | |
|---|---|---|---|---|
| 2005/0047175 A1* | 3/2005 | Kawasaki | ............... | H02M 3/01 |
| | | | | 363/16 |
| 2012/0112693 A1* | 5/2012 | Kusch | ..................... | B60L 58/20 |
| | | | | 320/109 |
| 2016/0121749 A1* | 5/2016 | Mensah-Brown | ........ | H02J 7/34 |
| | | | | 307/10.1 |
| 2020/0247340 A1* | 8/2020 | Furukawa | ................. | B60L 3/04 |
| 2022/0140300 A1* | 5/2022 | Yang | ................... | H02J 7/00302 |
| | | | | 320/118 |

FOREIGN PATENT DOCUMENTS

| | | | | | | |
|---|---|---|---|---|---|---|
| CN | 216390803 U | * | 4/2022 | ............. | Y02B 70/10 |
| KR | 20200125789 A | * | 11/2020 | ............. | B60L 53/24 |
| WO | WO-2012127673 A1 | * | 9/2012 | ............. | B60L 55/00 |

OTHER PUBLICATIONS

H. R. Gujar and V. M. Panchade, "A Method for Two-Stage Fast Charging Facilities for Electric Vehicle Charging Systems," 2022 IEEE North Karnataka Subsection Flagship International Conference (NKCon), Vijaypur, India, 2022, pp. 1-6 (Year: 2022).*

* cited by examiner

200

300

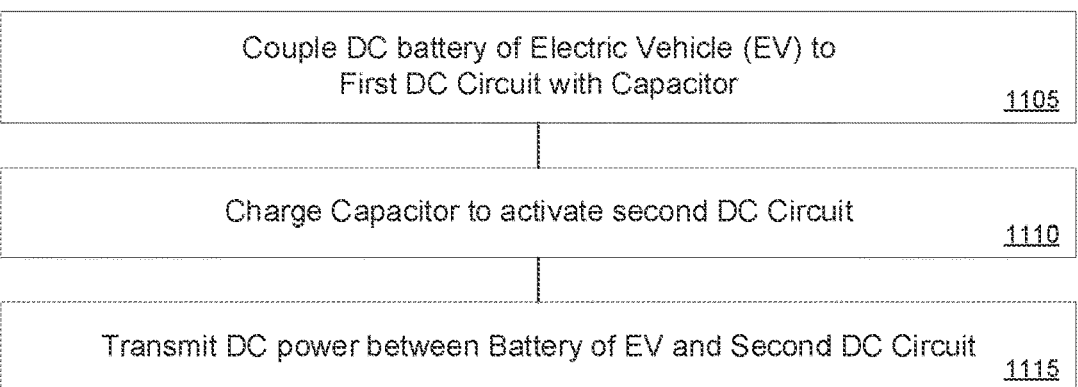

1100

Couple DC battery of Electric Vehicle (EV) to
First DC Circuit with Capacitor                    1105

Charge Capacitor to activate second DC Circuit     1110

Transmit DC power between Battery of EV and Second DC Circuit    1115

FIG. 11

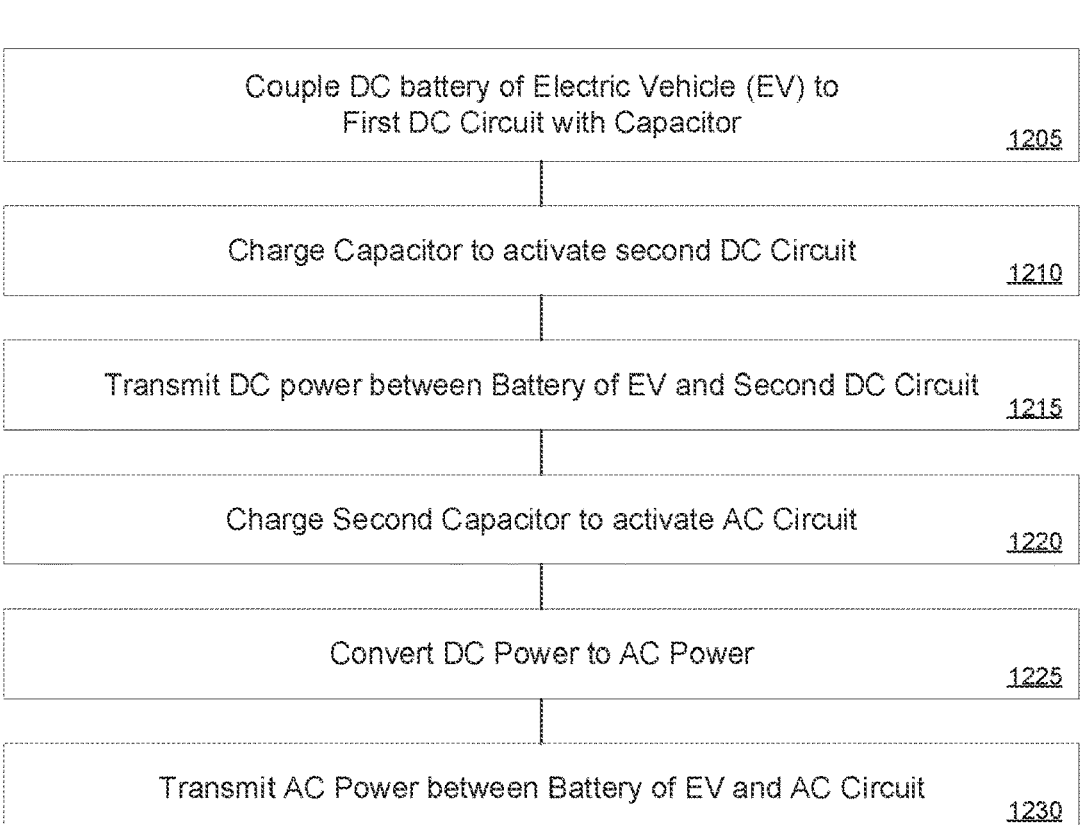

1200

Couple DC battery of Electric Vehicle (EV) to
First DC Circuit with Capacitor                    1205

Charge Capacitor to activate second DC Circuit     1210

Transmit DC power between Battery of EV and Second DC Circuit    1215

Charge Second Capacitor to activate AC Circuit     1220

Convert DC Power to AC Power                        1225

Transmit AC Power between Battery of EV and AC Circuit    1230

FIG. 12

POWER TRANSMISSION BETWEEN ELECTRIC VEHICLE BATTERY AND ALTERNATING-CURRENT POWER SYSTEM

INTRODUCTION

Transfer of electricity from a source to a destination can be prevented due to incompatible electrical characteristics of the source and the destination. Various disadvantages can arise from an inability to transfer electricity from a source to a destination.

SUMMARY

This disclosure is generally directed to charger systems supporting bidirectional transmission of electrical power between a grid-connected electrical system and a battery-powered electrical system. A grid-connected electrical system can include, for example, an electrical system of a structural improvement to real estate and connected to an alternating-current (AC) electrical grid. A structural improvement to real estate can include a home, residence, office, base, or any combination thereof, for example. A battery-powered electrical system can include an electric vehicle (EV) powered by a direct-current (DC) battery. This technical solution can include one or more circuits to transmit electrical power between a DC battery and an AC circuit of a grid-connected electrical system. Thus, for example, an electric vehicle can provide power to a home by the DC battery of the EV to the AC electrical system of the home.

At least one aspect is directed to a system. The system can include a first direct-current (DC) circuit to couple with a DC battery of an electric vehicle. The system can include a capacitor of the first DC circuit configured to charge to a capacitance that satisfies a threshold of activation of a second DC circuit. The system can include the first DC circuit to transmit, in response to a determination that the capacitor satisfies the threshold of activation of the second DC circuit, DC power between the battery of the electric vehicle and the second DC circuit.

At least one aspect is directed to a method. The method can include coupling a direct-current (DC) battery of an electric vehicle with a first DC circuit can include a capacitor. The method can include charging, in response to the coupling, a capacitor to a capacitance satisfying a threshold of activation of a second DC circuit. The method can include transmitting, by the first DC circuit in response to a determination that the capacitor satisfies the threshold of activation of the second DC circuit, DC power between the battery of the electric vehicle and the second DC circuit.

At least one aspect is directed to a system. The system can include a first direct-current (DC) circuit to couple with a DC battery of an electric vehicle. The system can include a capacitor of the first DC circuit configured to charge to a capacitance satisfying a threshold of activation. The system can the first DC circuit to transmit, in response to a determination that the capacitor satisfies the threshold of activation, DC power from or to the battery of the electric vehicle. The system can include a second DC circuit coupled with the first DC circuit and configured to transmit, in response to receiving the DC power, which can be from the AC power corresponding from or to an alternating-current (AC) circuit. The threshold of activation can be based on the second DC circuit.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 11 depicts an example method of power transmission between an EV battery and an AC power system, in accordance with present implementations.

FIG. 12 depicts another example power transmission between an EV battery and an AC power system, in accordance with present implementations.

DETAILED DESCRIPTION

Figure 1:
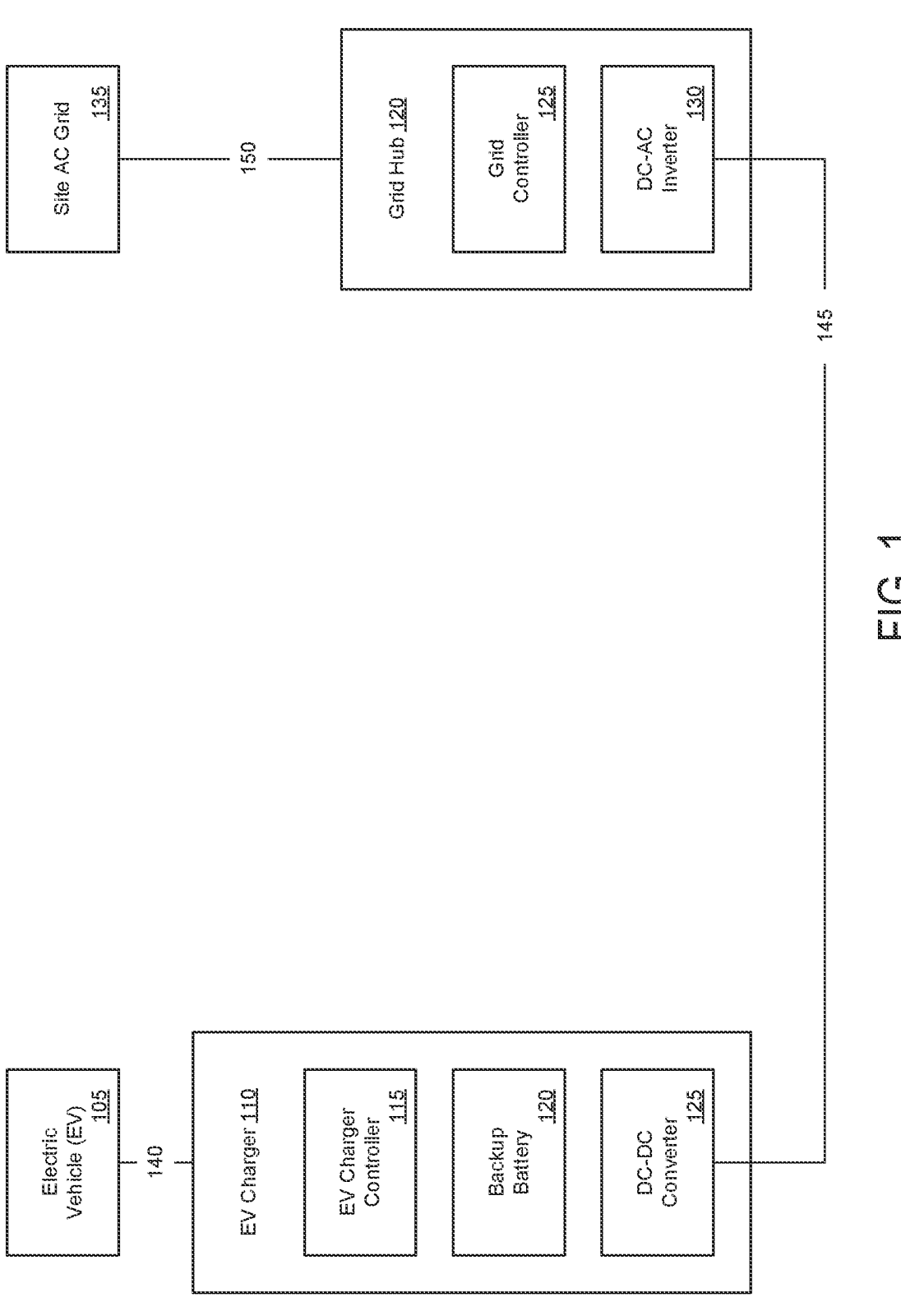
FIG. 1 depicts an example system, in accordance with present implementations.

Following below are more detailed descriptions of various concepts related to, and implementations of, methods, apparatuses, and systems of power transmission between an EV battery and an AC power system. The various concepts introduced above and discussed in greater detail below may be implemented in any of numerous ways.

This technical solution can include one or more electrical circuits to provide power bidirectionally between a grid-connected electrical system and a battery-powered electrical system under a variety of electrical states of the grid-connected electrical system. A system of this technical solution can include an EV connection circuit to precharge a capacitor of the EV connection circuit from a DC battery of an EV, and to precharge a capacitor of a grid-connected electrical system. A charger assistant circuit can be connected with an AC circuit of the grid-connected electrical system, and can include a relay to transmit power from the AC circuit to precharge the capacitor the grid-connected electrical system. The EV connection circuit can precharge the capacitor of the grid-connected electrical system, where the AC circuit does not provide power and a DC circuit of the grid-connected electrical system has discharged. Thus, this technical solution can connect a DC battery of an EV to a grid-connected electrical system and transmitting power between the DC battery and the grid-connected electrical system. The technical solution can provide a technical improvement including at least transmitting power from a DC battery of an EV to a home AC electrical system in the absence of power sufficient to activate one or more of a DC electrical system and an AC electrical system of a grid-connected electrical system. This technical solution can conserve power, for example from a fossil fuel grid-connected power system by using clean-sourced (e.g., solar or wind) power of a battery-powered system, and therefore can reduce greenhouse gas emissions.

This technical solution is directed to a home battery and a home power-generation system. A home power-generation system can include, for example, a solar panel array installed as an improvement real estate or a structure improving the real estate. The home power-generation system can include, optionally, an inverter to convert DC power to AC power. The inverter can be included as part of or coupled with the system and distinct from the home power-generation system. An example electrical system can include an EV connection circuit, a DC circuit of the grid-connected electrical system, an AC electrical system of the grid-connected electrical system, a DC-DC converter connecting the EV connection circuit and the DC circuit of the grid-connected electrical system, an DC-AC inverter connecting the DC circuit of the grid-connected electrical system and the AC electrical system of the grid-connected electrical system. The EV connection circuit can include a first precharge capacitor and the DC circuit of the grid-connected electrical system can include a second precharge capacitor.

FIG. 1 depicts an example system, in accordance with present implementations. As illustrated by way of example in FIG. 1, a system 100 can include at least an electric vehicle 105, an EV charger 110, a grid hub 120, a site AC grid 135, an EV DC power bus 140, a site DC power bus 145, and a AC power bus 150. The electric vehicle (EV) 105 can include a particular vehicle among electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities.

The EV charger 110 can operatively couple with the EV 105 to provide, for example, electric charge to a battery of the EV 105. The EV charger 110 can include at least one electrical circuit to transmit, convert, and control flow of electricity between the EV charger 110 and any component connected with the EV charger 110. The EV charger 110 can cause bidirectional power flow of electricity. For example, bidirectional power flow can include power flowing to the EV 105 from the EV charger 110. For example, bidirectional power flow can include power flowing from the EV 105 to the EV charger 110. The EV charger 110 can couple the EV 105 with the site AC grid 135. For example, bidirectional power flow can include power flowing to the EV 105 from the site AC grid 135 via the EV charger 110. For example, bidirectional power flow can include power flowing from the EV 105 to the site AC grid 135 via the EV charger 110. The EV charger 110 can include an EV charger controller 115, a backup battery 120, and a DC-DC converter 125.

The EV charger controller 115 can transmit one or more instructions to the EV charger 110 to modify operation of the EV charger 110, or any component thereof. The EV charger controller 115 can transmit one or more instructions to the EV charger 110 to modify operation of the EV 105 or any component thereof. For example, the EV charger controller 115 can cause the EV 105 to start or cease transmission of electrical power between the EV 105 and the EV charger 110. For example, the transmission can include a transmission of electrical power to or from the EV 105 with respect to the EV charger 110. The EV charger controller 115 can include one or more logical or electronic devices including but not limited to integrated circuits, logic gates, flip flops, gate arrays, programmable gate arrays, and the like. The EV charger controller 115 can correspond at least partially in one or more of structure and operation to the device of FIG. 10.

The backup battery 120 can provide electrical power to the EV charger 110 to satisfy an activation threshold of the EV charger 110. The activation threshold of the EV charger 110 can correspond to a power level sufficient to or required to activate the EV charger 110. For example, the power level sufficient to activate the EV charger 110 can include a minimum threshold voltage to activate or power on the EV charger 110 in the absence of electrical power at the minimum threshold voltage received from the site DC power bus 145 at the EV charger 110. The backup battery 120 can include one or more electrical, electronic, electromechanical, electrochemical, or like devices or systems for at least one of receiving, storing and distributing input power. The backup battery 120 can include one or more stacks of batteries. For example, the backup battery 120 can include lithium-ion, cadmium, or like energy storage. The backup battery 120 can be integrated with, integrable with, or separable from the EV charger 110. The backup battery 120 can include a plurality of battery units variously or entirely integrated with, integrable with, or separable from the EV charger 110.

The DC-DC converter 125 can transform DC power between power compatible with the EV charger 110 and power compatible with the site DC power bus 145. For example, the DC-DC converter 125 can convert power received at the EV charger 110 at a voltage level between 360 V and 550 V, to a voltage level corresponding to the EV DC power bus 140 between 200 V and 920 V. The DC-DC converter 125 can transform power bidirectionally at least between any of the components discussed herein, and is not limited to the devices or transmission directions discussed by way of example herein.

The grid hub 120 can operatively couple with the site AC grid 135 to provide, for example, electric charge to the site AC grid 135. The grid hub 120 can include at least one electrical circuit to transmit, convert, and control flow of electricity between the grid hub 120 and any component connected with the grid hub 120. The grid hub 120 can cause bidirectional power flow of electricity. For example, bidirectional power flow can include power flowing to the site AC grid 135 from the grid hub 120. For example, bidirectional power flow can include power flowing from the site AC grid 135 to the grid hub 120. The grid hub 120 can couple the EV 105 with the site AC grid 135. For example, bidirectional power flow can include power flowing to the EV 105 from the site AC grid 135 via the grid hub 120. For example, bidirectional power flow can include power flowing from the EV 105 to the site AC grid 135 via the grid hub 120. The grid hub 120 can include one or more electrical components of devices at least partially enclosed in a housing. For example, the grid hub 120 can include an at-home power management hub device, and can be mounted on a wall or the like of a residential garage or the like. The grid hub 120 can include a grid controller 125, and a DC-AC inverter 130.

The grid controller 125 can transmit one or more instructions to the grid hub 120 to modify operation of the grid hub 120, or any component thereof. The grid controller 125 can transmit one or more instructions to the grid hub 120 to modify operation of the EV 105 or any component thereof. For example, the EV charger controller 115 can cause the EV 105 to start or cease transmission of electrical power between the EV 105 and the grid hub 120. For example, the transmission can include a transmission of electrical power to or from the EV 105 with respect to the grid hub 120. The grid controller 125 can include one or more logical or electronic devices including but not limited to integrated circuits, logic gates, flip flops, gate arrays, programmable gate arrays, and the like. For example, the grid controller 125 can cause the EV 105 to be electrically coupled with the site AC grid 135 to either charge the EV 105 or discharge the EV 105 to provide power to the site AC grid 135. The grid controller 125 can correspond at least partially in one or more of structure and operation to the device of FIG. 10.

The DC-AC inverter 130 can transform DC power compatible with the site DC power bus 145 to and from power compatible with the AC power bus 150. For example, the DC-DC converter 125 can convert power received at the EV charger 110 at a voltage level between 360 V and 550 V, to a voltage level corresponding to the EV DC power bus 140 between 200 V and 920 V. The DC-DC converter 125 can transform power bidirectionally at least between any of the components discussed herein, and is not limited to the devices or transmission directions discussed by way of example herein.

The site AC grid 135 can include an AC power system receiving or configured to receive power from an AC electrical grid. An AC electrical grid can include, for example, a municipal electrical grid coupled with a grid-scale power generation system. A grid-scale power generation system can include a power plant operating with a primary stage actuated by energy originating from, for example, oil, gas, coal, nuclear, solar, geothermal, or wind sources, or any combination thereof. The site AC grid 135 can include or corresponding to an electrical grid powering a residential or commercial building. A residential or commercial building can correspond to an improvement of real estate as discussed herein. Thus, the site AC grid 135 can correspond to the electrical circuits terminating at a building to provide power to various devices and systems associated with or located at or within the building.

The EV DC power bus 140 can electrically connect the EV 105 with the EV charger 110. The EV DC power bus 140 can operate at a particular power level or power range compatible with the EV 105 and the EV charger 110. For example, the EV DC power bus 140 can operate at a DC voltage between 200 V and 920 V. The site DC power bus 145 can electrically connect the EV charger 110 with the grid hub 120. The site DC power bus 145 can operate at a particular power level or power range compatible with the EV charger 110 and the grid hub 120. For example, the site DC power bus 145 can operate at a DC voltage between 360 V and 550 V. The AC power bus 150 can electrically connect the site AC grid 135 with the grid hub 120. The AC power bus 150 can operate at a particular power level or power range compatible with the site AC grid 135 and the grid hub 120. For example, the site AC grid 135 can operate at an AC voltage between 120 V and 240 V.

The system 100 can include a first DC circuit 140 having a first maximum voltage, the second DC circuit 145 having a second maximum voltage less than the first maximum voltage. The system 100 can include the first DC circuit 140 to transmit, from the battery of the electric vehicle 105 to the second DC circuit 145, the DC power. The system 100 can include the first DC circuit 140 to cause the second DC circuit 145 to transmit, from the electric vehicle 105 to an alternating-current (AC) circuit 135 in response to receiving the DC power at the second DC circuit 145, AC power corresponding to the DC power.

Figure 2:
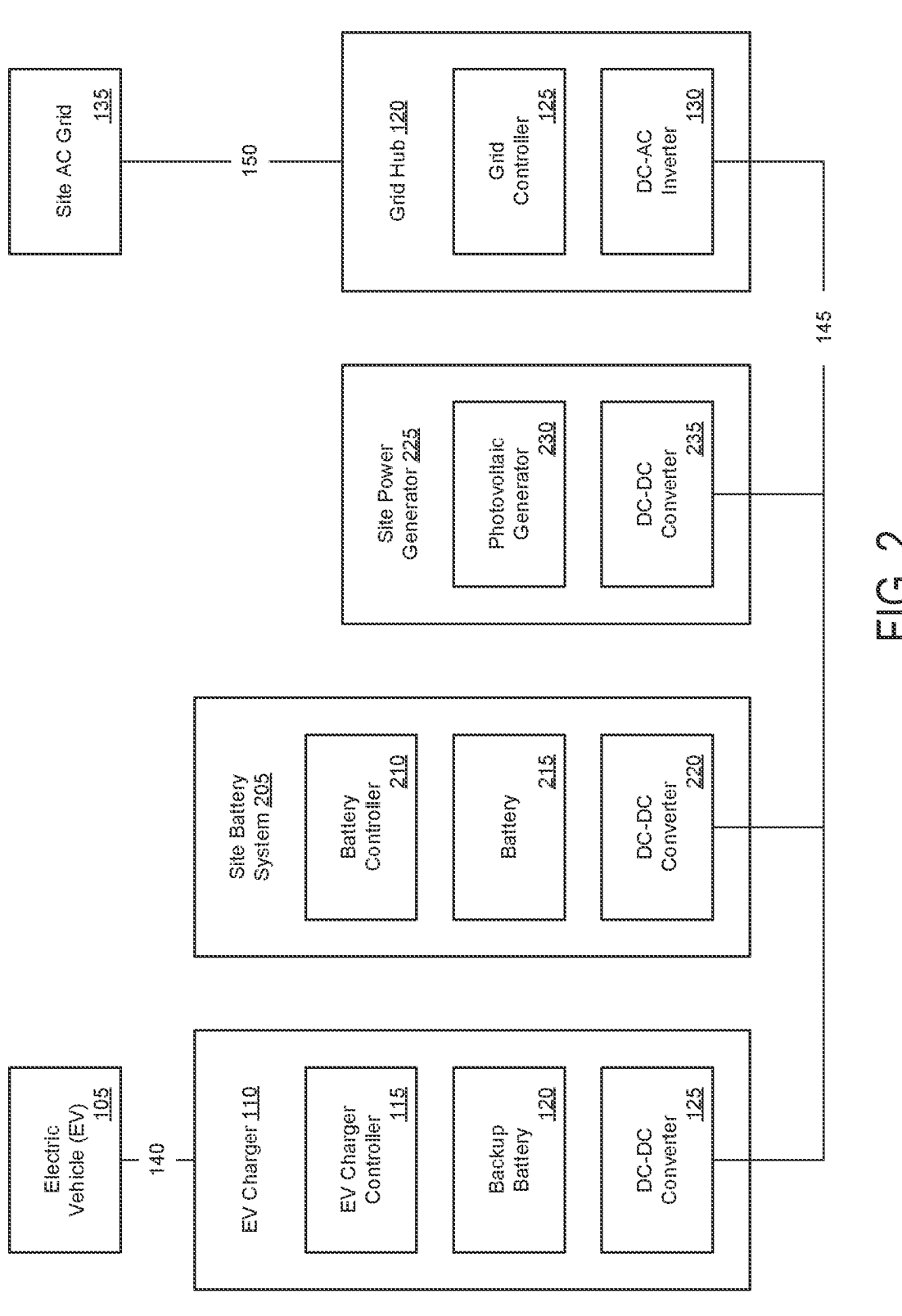
FIG. 2 depicts an example system, in accordance with present implementations.

FIG. 2 depicts an example system, in accordance with present implementations. As illustrated by way of example, FIG. 2 can include at least a site battery system 205, a battery 215, and a site power generator 225.

The site battery system 205 can provide stored electrical power to the site AC grid 135 via the grid hub 120. The site battery system 205 can receive power from one or more of the EV 105, the site AC grid 120, and the site power generator 225 to charge the site battery system 205. The site battery system 205 can transmit power to one or more of the EV 105, and the site AC grid 120, to discharge the site battery system 205 and activate or maintain an activated state of one or more of the EV 105, the site AC grid 120, and the site power generator 225. The site battery system 205 can include one or more electrical components of devices at least partially enclosed in a housing. For example, the site battery system 205 can include an at-home battery device, and can be mounted on a wall or the like of a residential garage or the like. The site battery system 205 can include a battery controller 210, a battery 215, and a DC-DC converter 220.

The battery controller 210 can transmit one or more instructions to the site battery system 205 to modify operation of the site battery system 205, or any component thereof. The battery controller 210 can transmit one or more instructions to the site battery system 205 to modify operation of the EV 105, the site AC grid 135, or any component thereof. For example, the site battery system 205 can cause the site battery system 205 to start or cease transmission of electrical power between the site battery system 205 and the site AC grid 135. For example, the transmission can include a transmission of electrical power to or from the battery 215 with respect to the site AC grid 135. The battery controller 210 can include one or more logical or electronic devices including but not limited to integrated circuits, logic gates, flip flops, gate arrays, programmable gate arrays, and the like. The battery controller 210 can correspond at least partially in one or more of structure and operation to the device of FIG. 10.

The battery 215 can provide electrical power to the EV 105 or the site AC grid 135 to satisfy an activation threshold of the site AC grid 120. The activation threshold of the site AC grid 120 can correspond to a power level sufficient to or required to activate the site AC grid 120. For example, the power level sufficient to activate the site AC grid 120 can include a minimum threshold AC voltage to activate or power on the site AC grid 120 in the absence of electrical power at the minimum AC threshold voltage received from the electrical grid. The battery 215 can include one or more electrical, electronic, electromechanical, electrochemical, or like devices or systems for at least one of receiving, storing and distributing input power. The battery 215 can include one or more stacks of batteries. For example, the battery 215 can include lithium-ion, cadmium, or like energy storage. The battery 215 can be integrated with, integrable with, or separable from the site battery system 205. The battery 215 can include a plurality of battery units variously or entirely integrated with, integrable with, or separable from the site battery system 205. The DC-DC converter 220 can transform DC power between power compatible with the site battery system 205 and power compatible with the site DC power bus 145. The DC-DC converter 220 can transform power bidirectionally at least between any of the components discussed herein, and is not limited to the devices or transmission directions discussed by way of example herein.

The site power generator 225 can provide electrical power to the EV 105 or the site AC grid 135 to satisfy an activation threshold of the site AC grid 120. The site power generator 225 can include a commercial-scale power generation system. A grid-scale power generation system can include a solar power array, a wind turbine, a diesel generator, or any combination thereof. The site power generator 225 can include a photovoltaic generator 230, and a DC-DC converter 235. The photovoltaic generator 230 can, for example, include a solar power array installed on a structure or on a portion of real estate. The photovoltaic generator 230 can include one or more photovoltaic cells or devices to convert photon energy, including energy from visible light or sunlight, into electrical energy. The DC-DC converter 235 can transform DC power between power compatible with the site power generator 225 and power compatible with the site DC power bus 145. The DC-DC converter 220 can transform power bidirectionally at least between any of the components discussed herein, and is not limited to the devices or transmission directions discussed by way of example herein.

Figure 3:
FIG. 3 depicts an example power transmission system, in accordance with present implementations.
Figure 3:

FIG. 3 depicts an example power transmission system, in accordance with present implementations. As illustrated by way of example, FIG. 3 can include at least a site pre-charge circuit 305, an EV charger pre-charge circuit 310, an EV battery 315, a pre-charge voltage converter 320, a site voltage converter 325, a converter bus 330, a backup bus 335, an assistant bus 340, an EV bus 345, a battery output converter 350, a charger controller 355, a charger assistant circuit 360, a relay control bus 365, and a relay circuit 380.

The site pre-charge circuit 305 can include one or more capacitors to collectively retain a particular charge level. The particular charge level can correspond to a charge sufficient to activate the site AC grid 135 to the minimum threshold voltage of the AC power bus 150. The DC power at the site DC power bus 145 can charge the site pre-charge circuit 305. For example, the site DC power bus 145 can begin charging the site pre-charge circuit 305 to the particular charge level after the site DC power bus 145 reaches its minimum threshold voltage. Thus, the site DC power bus 145 can pre-charge the site pre-charge circuit 305 to activate the AC power bus 150. For example, the site DC power bus 145 can activate the AC power bus 150 in the event of loss of power to the site AC grid 135 due to a "blackout" or "brownout" of the electrical grid coupled to the site AC grid 135. The site pre-charge circuit 305 can have an aggregate capacitance of, for example, 5 mF, to achieve a particular charge level to activate the AC power bus 150 to 120 V or 240 V.

The EV charger pre-charge circuit 310 can include one or more capacitors to collectively retain a particular charge level. The particular charge level can correspond to a charge sufficient to activate the site DC power bus 145 to the minimum threshold voltage of the site DC power bus 145. The DC power at the EV DC power bus 140 can charge the EV charger pre-charge circuit 310. For example, the EV DC power bus 140 can begin charging the EV charger pre-charge circuit 310 to the particular charge level after the EV DC power bus 140 reaches its minimum threshold voltage. Thus, the EV DC power bus 140 can pre-charge the EV charger pre-charge circuit 310 to activate the site DC power bus 145. For example, the EV DC power bus 140 can activate the site DC power bus 145 in the event of loss of power to the site AC grid 135 due to a "blackout" or "brownout" of the electrical grid coupled to the site AC grid 135, and unavailability of power at one or more of the site battery system 205 and the site power generator 225. EV charger pre-charge circuit 310 can have an aggregate capacitance of, for example, 150 μF, to achieve a particular charge level to activate the site DC power bus 145 to 360 V or 550 V. The EV battery 315 can correspond at least partially in one or more of structure and operation to the devices of one or more of FIGS. 5-9. This technical solution can conserve power, for example from a fossil fuel grid-connected power system by using clean-sourced (e.g., solar or wind) power of a battery-powered system, and therefore can reduce greenhouse gas emissions.

The pre-charge voltage converter 320 can charge the EV charger pre-charge circuit 310 via one or more of the backup battery 120, AC power bus 150, and the charger assistant 360. For example, where the AC power bus 150 is activated, the pre-charge voltage converter 320 can receive power from the AC power bus 150 to charge the EV charger pre-charge circuit 310. For example, where the AC power bus 150 is not activated, the pre-charge voltage converter 320 can receive power from the backup battery 120 to charge the EV charger pre-charge circuit 310. The pre-charge voltage converter 320 can receive a lower DC voltage and convert the lower DC voltage to a higher DC voltage corresponding to the EV DC power bus 140 to charge the EV charger pre-charge circuit 310. For example, the lower DC voltage can range between 9 V and 24 V.

The site voltage converter 325 can, for example, include a unidirectional and isolated DC-DC converter which converters DC voltage across capacitor bank 305 from 360~550V to a low voltage bus 330 at 24V, in order to power up controller circuit 355 and charge backup battery 120 via battery output converter 350.

The converter bus 330 can couple the pre-charge voltage converter 320, the site voltage converter 325, the battery output converter 350, and the charger controller 355. The converter bus 330 can, for example, operate at a DC voltage in the range between 9 V and 24 V. The backup bus 335 can couple the pre-charge voltage converter 320, the site voltage converter 325, the battery output converter 350, and the charger controller 355 with the backup battery 120. The converter bus 330 can, for example, operate at a DC voltage in the range between 9 V and 16 V. The assistant bus 340 can couple the pre-charge voltage converter 320, the site voltage converter 325, the battery output converter 350, and the charger controller 355 with the charger assistant circuit 360. The assistant bus 340 can, for example, operate at a DC voltage in the range between 16 V and 24 V. The EV bus 345 can couple the EV 105 with the charger controller 355. The EV bus 345 can, for example, transmit a control signal between the charger controller 355 and the EV 105. The EV bus 345 can perform bidirectional communication in half-duplex or full-duplex mode.

The battery output converter 350 can charge the backup battery 120 via one or more of the AC power bus 150 and the charger assistant circuit 360. For example, the battery output converter 350 can receive power from the AC power bus 150 or the charger assistant circuit 360 to charge the backup battery 120. The battery output converter 350 can receive a higher DC voltage and convert the higher DC voltage to a lower DC voltage corresponding to the converter bus 330 to charge the backup battery 120. For example, the higher DC voltage can range between 16 V and 24 V and the lower DC voltage can range between 9 V and 16 V.

The charger controller 355 can activate and deactivate the relay circuit 380 by an activation signal via the relay bus 365. The charger controller 355 can correspond at least partially in one or more of structure and operation to the device of FIG. 10. The charger controller 355 can activate and deactivate the relay circuit 380 in response to a determination that one or more of the AC power bus 150, the EV bus 345, and the converter bus 330 have particular states of activation. For example, the charger controller 355 can activate the relay circuit 380 in response to detecting via the site voltage converter 325 that the AC power bus 150 is activated. Thus, the charger controller 355 can, for example, cause the AC power bus 150 to charge the site pre-charge circuit 305.

The charger assistant circuit 360 can cause the AC power bus 150 to charge the site pre-charge circuit 305. The charger assistant circuit 360 can include a rectifier circuit 370, an assistant voltage converter 375, a relay circuit 380, and a current limiter circuit 385. The rectifier circuit 370 can generate DC power compatible with the relay circuit 380 based on the AC power at the AC power bus 150. This charger assistant circuit 360 can conserve power, for example from a fossil fuel grid-connected power system by using clean-sourced (e.g., solar or wind) power of a battery-powered system, and therefore can reduce greenhouse gas emissions.

The assistant voltage converter 375 can convert the rectified DC voltage from AC grid 135 to a low voltage bus 340, in order to power the low voltage bus 330, which powers up controller circuit 355, battery output converter 350 when DC bus 145 drops to 0V. The lower DC voltage 340 can range between 16 V and 24 V.

The relay circuit 380 can include a coil and a contactor. The coil can be coupled to the relay bus 365 and to a ground or reference voltage. Thus, the signal by the relay bus 365 can activate the relay circuit 380 by activating the coil. The coil can activate the contactor of the relay circuit 380. The contactor of the relay circuit can be coupled with current limiter circuit 385. The current limiter circuit 385 can include, for example, a resistor, an NTC resistor, or a blocking diode, or any combination thereof. The relay circuit 380 can perform the corresponding function based on the voltage difference between AC grid 135 and DC bus 145.

The system 300 can include the first DC circuit 145 to cause a second capacitor 305 of the second DC circuit 145 to charge to a second predetermined charge satisfying a threshold of activation of an alternating-current (AC) circuit 150, and to transmit, between the second DC circuit 145 and the AC circuit 150 in response to a determination that the second capacitor 305 satisfies the threshold of activation of the AC circuit 150, AC power corresponding to the DC power. The system 300 can include a relay 380 to couple the AC circuit 150 with the second DC circuit 145 and to charge a second capacitor 305 to a second predetermined charge satisfying a threshold of activation of the AC circuit 150, the second DC circuit 145 can include the second capacitor 305. The system 300 can include the first DC circuit 140 to cause, in response to a determination that a voltage level of the second DC circuit 145 satisfies a second threshold of activation, a second capacitor 305 of the second DC circuit 145 to charge to a second predetermined charge satisfying a threshold of activation of the AC circuit 150, the second DC circuit 145 can include the second capacitor 305.

The system 300 can include the first DC circuit 140 to cause, a second capacitor 305 of the second DC circuit 145 to charge to a second capacitance satisfying a threshold of activation of the AC circuit 150, the second DC circuit 145 can include the second capacitor 305. The system 300 can include the first DC circuit 140 to cause an inverter 130 coupling the second DC circuit 145 and an alternating-current (AC) circuit 150 to convert, in response to determination that a second capacitor 305 has a charge corresponding to the predetermined charge, the DC power to AC power. The system 300 can include a second capacitor 305 of the second DC circuit 145 configured to charge to a capacitance satisfying a threshold of activation of the AC circuit 150, the second DC circuit 145 to transmit, to the AC circuit 150 in response to a determination that the second capacitor 305 satisfies the threshold of activation of the AC circuit 150, the AC power. The system 300 can include a relay to couple the AC circuit 150 with the second DC circuit 145, the relay 380 configured to charge the second capacitor 305 to the second predetermined charge.

Figure 4:
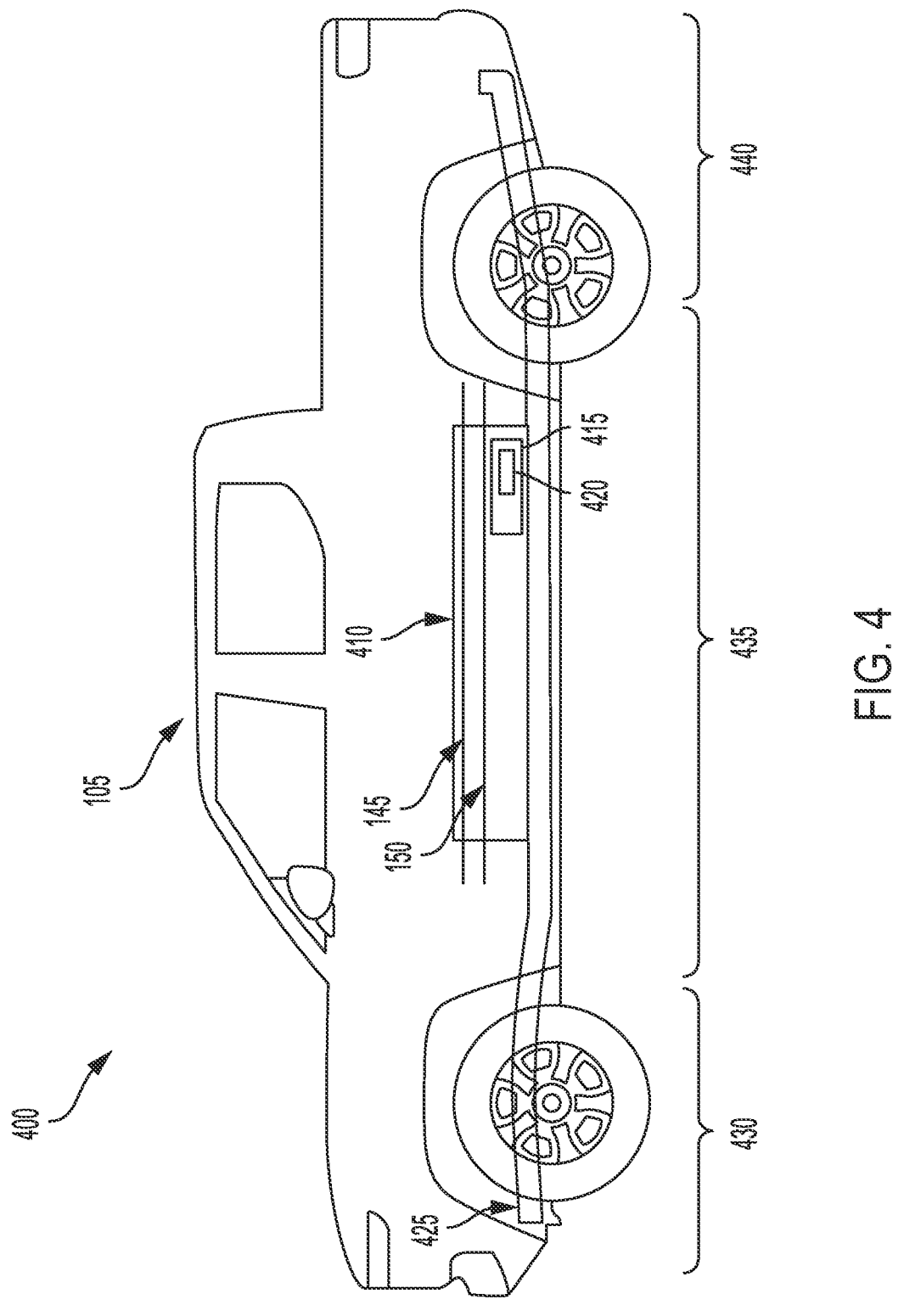
FIG. 4 depicts an electric vehicle compatible with power transmission between an EV battery and an AC power system.

FIG. 4 depicts an example cross-sectional view 400 of an electric vehicle 105 installed with at least one battery pack 410. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 410 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 415 or battery modules 415, or battery cells 420 to power the electric vehicles. The electric vehicle 105 can include a chassis 425 (e.g., a frame, internal frame, or support structure). The chassis 425 can support various components of the electric vehicle 105. The chassis 425 can span a front portion 430 (e.g., a hood or bonnet portion), a body portion 435, and a rear portion 440 (e.g., a trunk, payload, or boot portion) of the electric vehicle 105. The battery pack 410 can be installed or placed within the electric vehicle 105. For example, the battery pack 410 can be installed on the chassis 425 of the electric vehicle 105 within one or more of the front portion 430, the body portion 435, or the rear portion 440. The battery pack 410 can include or connect with at least one busbar, e.g., a current collector element. For example, the first busbar 145 and the second busbar 150 can include electrically conductive material to connect or otherwise electrically couple the battery 415, the battery modules 415, or the battery cells 420 with other electrical components of the electric vehicle 105 to provide electrical power to various systems or components of the electric vehicle 105.

Figure 5:
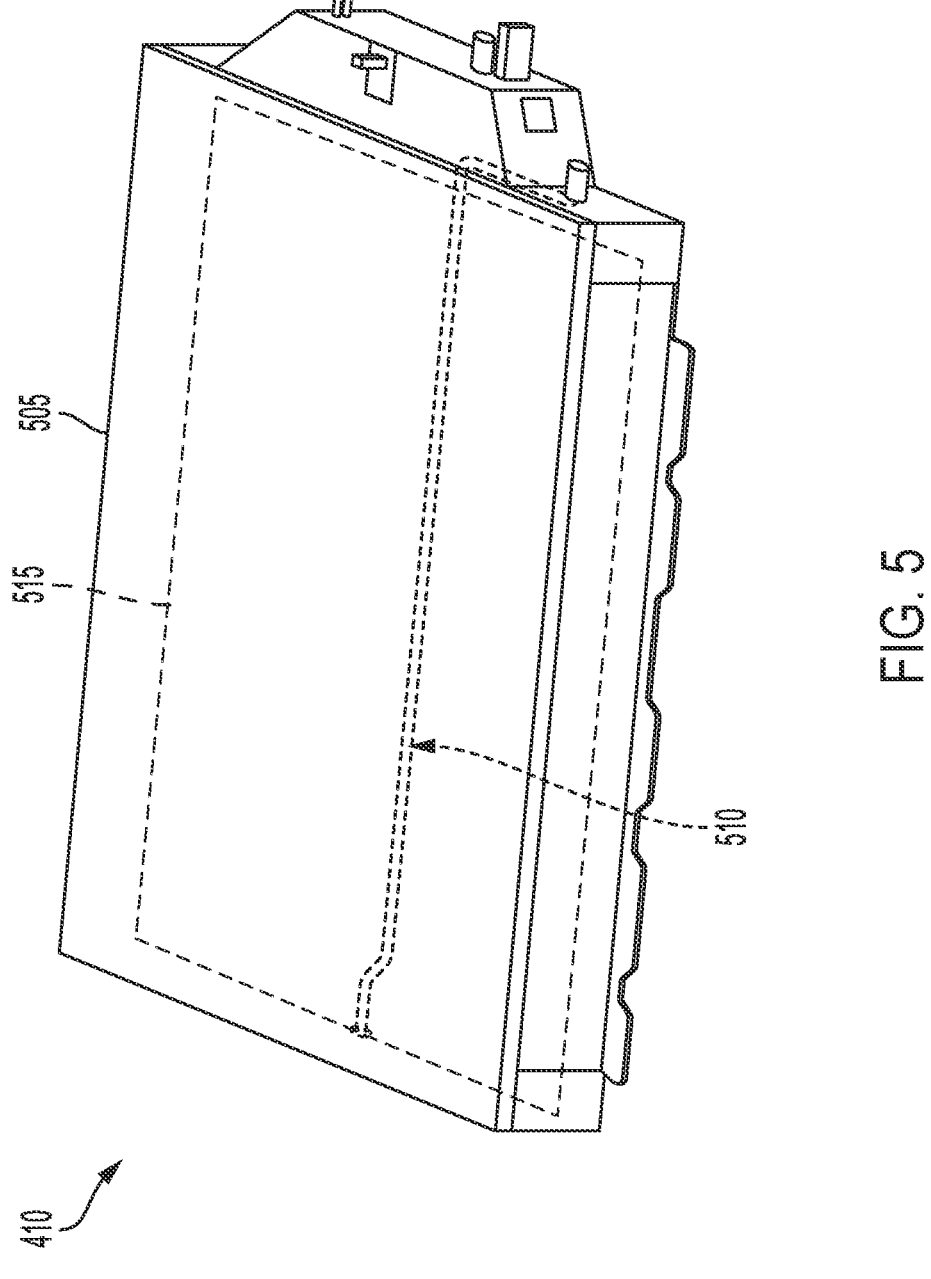
FIG. 5 depicts battery pack compatible with power transmission between an EV battery and an AC power system.

FIG. 5 depicts an example battery pack 410. Referring to FIG. 5, among others, the battery pack 410 can provide power to electric vehicle 105. Battery packs 110 can include any arrangement or network of electrical, electronic, mechanical or electromechanical devices to power a vehicle of any type, such as the electric vehicle 105. The battery pack 410 can include at least one housing 505. The housing 505 can include at least one battery module 415 or at least one battery cell 420, as well as other battery pack components. The battery module 415 can be or can include one or more groups of prismatic cells, cylindrical cells, pouch cells, or other form factors of battery cells 420. The housing 505 can include a shield on the bottom or underneath the battery module 415 to protect the battery module 415 and/or cells 420 from external conditions, for example if the electric vehicle 105 is driven over rough terrains (e.g., off-road, trenches, rocks, etc.) The battery pack 410 can include at least one cooling line 510 that can distribute fluid through the battery pack 410 as part of a thermal/temperature control or heat exchange system that can also include at least one thermal component (e.g., cold plate) 515. The thermal component 515 can be positioned in relation to a top submodule and a bottom submodule, such as in between the top and bottom submodules, among other possibilities. The battery pack 410 can include any number of thermal components 515. For example, there can be one or more thermal components 515 per battery pack 410, or per battery module 415. At least one cooling line 510 can be coupled with, part of, or independent from the thermal component 515.

Figure 6:
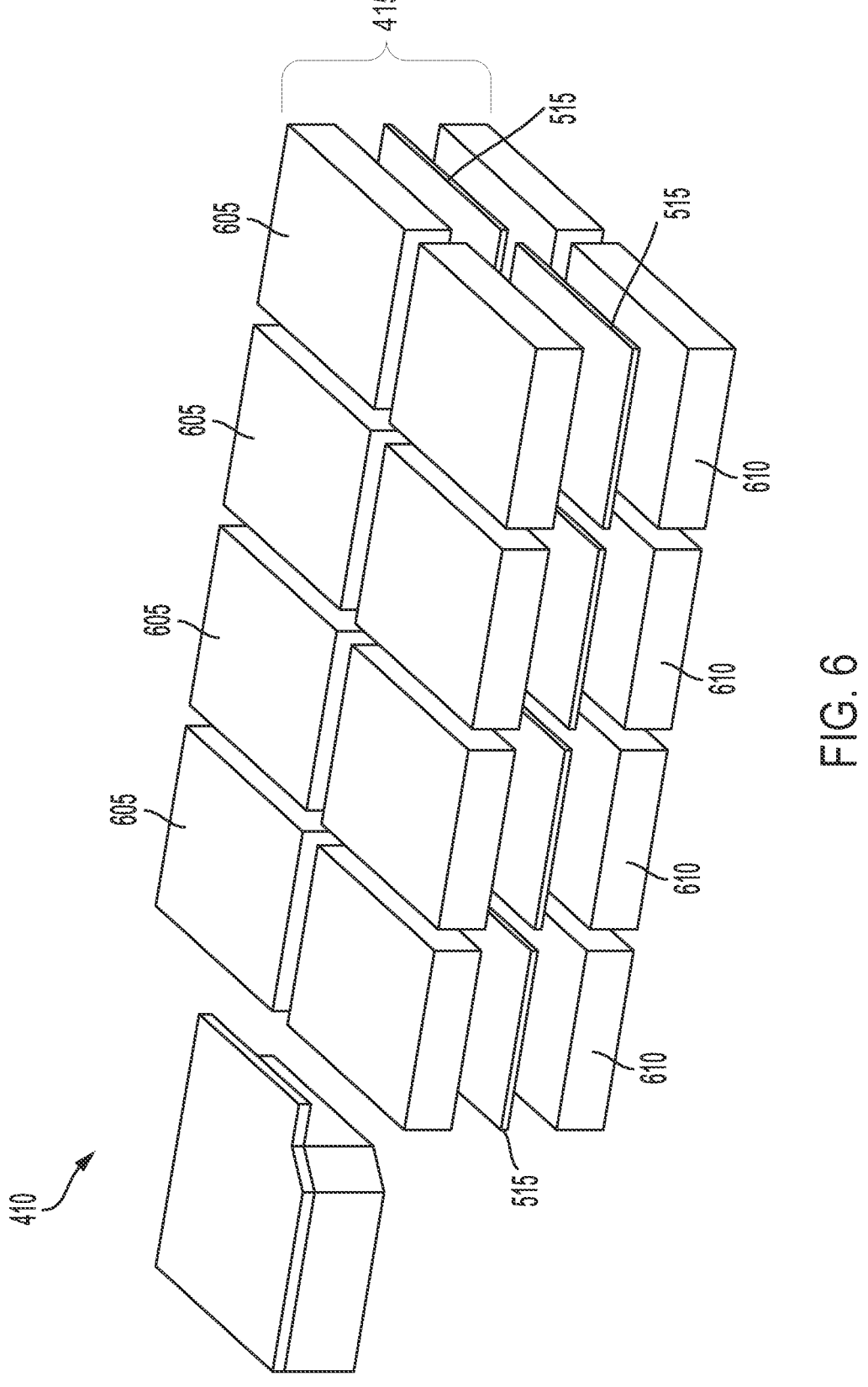
FIG. 6 depicts battery module compatible with power transmission between an EV battery and an AC power system.
Figure 7:
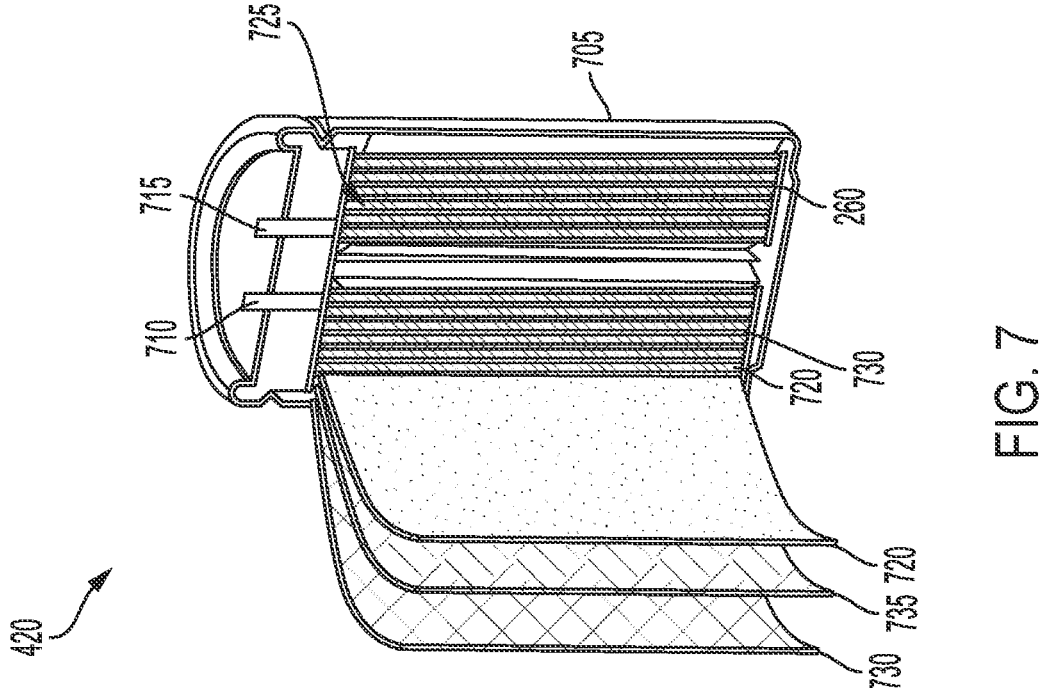
FIG. 7 depicts a cross sectional view of a battery cell compatible with power transmission between an EV battery and an AC power system.
Figure 8:
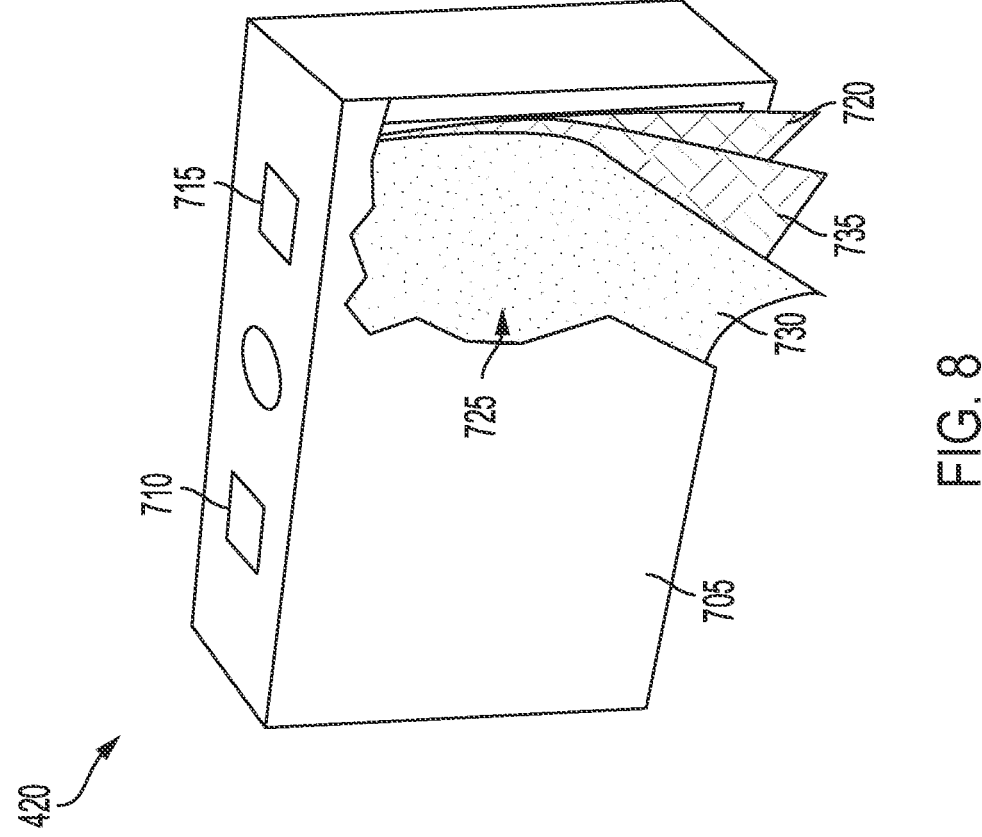
FIG. 8 depicts a cross sectional view of a battery cell compatible with power transmission between an EV battery and an AC power system.
Figure 9:
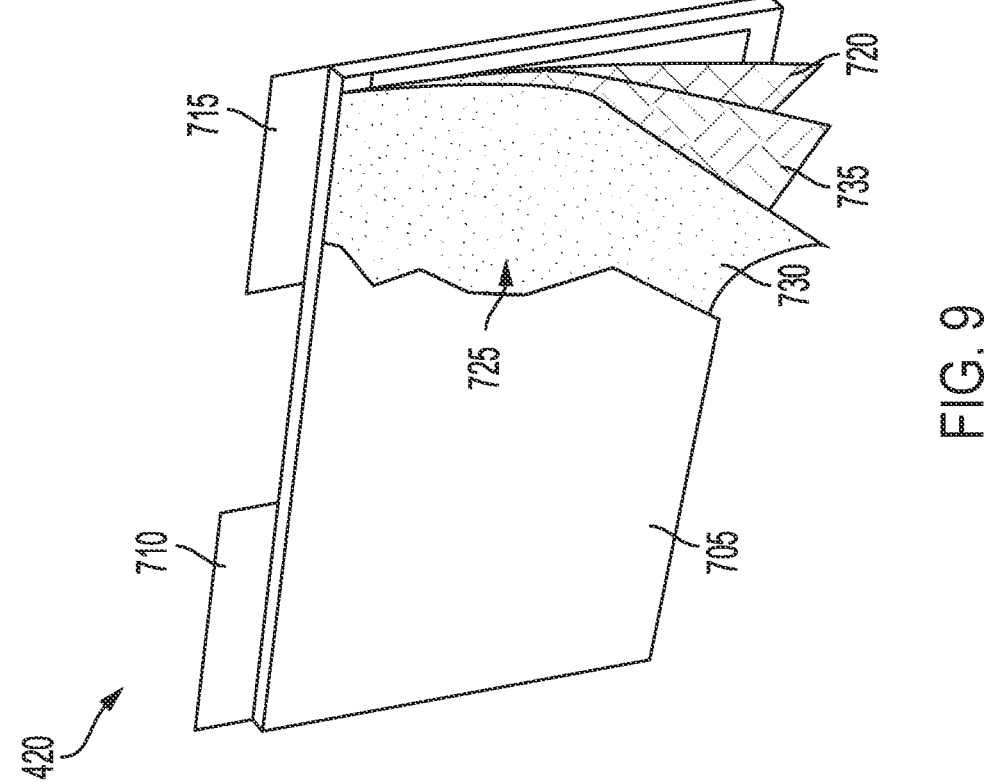
FIG. 9 depicts another cross sectional view of a battery cell compatible with power transmission between an EV battery and an AC power system.

FIG. 6 depicts example battery modules 415, and FIGS. 7, 8 and 9 depict an example cross sectional view of a battery cell 420. The battery modules 415 can include at least one submodule. For example, the battery modules 415 can include at least one first (e.g., top) submodule 605 or at least one second (e.g., bottom) submodule 610. At least one thermal component 515 can be disposed between the top submodule 605 and the bottom submodule 610. For example, one thermal component 515 can be configured for heat exchange with one battery module 415. The thermal component 515 can be disposed or thermally coupled between the top submodule 605 and the bottom submodule 610. One thermal component 515 can also be thermally coupled with more than one battery module 415 (or more than two submodules 605, 610). The thermal components 515 shown adjacent to each other can be combined into a single thermal component 515 that spans the size of one or more submodules 605 or 610. The thermal component 515 can be positioned underneath submodule 605 and over submodule 610, in between submodules 605 and 610, on one or more sides of submodules 605, 610, among other possibilities. The thermal component 515 can be disposed in sidewalls, cross members, structural beams, among various other components of the battery pack, such as battery pack 410 described above. The battery submodules 605, 610 can collectively form one battery module 415. In some examples each submodule 605, 610 can be considered as a complete battery module 415, rather than a submodule.

The battery modules 415 can each include a plurality of battery cells 420. The battery modules 415 can be disposed within the housing 505 of the battery pack 410. The battery modules 415 can include battery cells 420 that are cylindrical cells or prismatic cells, for example. The battery module 415 can operate as a modular unit of battery cells 420. For example, a battery module 415 can collect current or electrical power from the battery cells 420 that are included in the battery module 415 and can provide the current or electrical power as output from the battery pack 410. The battery pack 410 can include any number of battery modules 415. For example, the battery pack can have one, two, three, four, five, six, seven, eight, nine, ten, eleven, twelve or other number of battery modules 415 disposed in the housing 505. It should also be noted that each battery module 415 may include a top submodule 605 and a bottom submodule 610, possibly with a thermal component 515 in between the top submodule 605 and the bottom submodule 610. The battery pack 410 can include or define a plurality of areas for positioning of the battery module 415 and/or cells 420. The battery modules 415 can be square, rectangular, circular, triangular, symmetrical, or asymmetrical. In some examples, battery modules 415 may be different shapes, such that some battery modules 415 are rectangular but other battery modules 415 are square shaped, among other possibilities. The battery module 415 can include or define a plurality of slots, holders, or containers for a plurality of battery cells 420. It should be noted the illustrations and descriptions herein are provided for example purposes and should not be interpreted as limiting. For example, the battery cells 420 can be inserted in the battery pack 410 without battery modules 605 and 610. The battery cells 420 can be disposed in the battery pack 410 in a cell-to-pack configuration without modules 605 and 610, among other possibilities.

Battery cells 420 have a variety of form factors, shapes, or sizes. For example, battery cells 420 can have a cylindrical, rectangular, square, cubic, flat, pouch, elongated or prismatic form factor. As depicted in FIG. 7, for example, the battery cell 420 can be cylindrical. As depicted in FIG. 8, for example, the battery cell 420 can be prismatic. As depicted in FIG. 9, for example, the battery cell 420 can include a pouch form factor. Battery cells 420 can be assembled, for example, by inserting a winded or stacked electrode roll (e.g., a jelly roll) including electrolyte material into at least one battery cell housing 705. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 420 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 420. The housing 705 can be of various shapes, including cylindrical or rectangular, for example. Electrical connections can be made between the electrolyte material and components of the battery cell 420. For example, electrical connections to the electrodes with at least some of the electrolyte material can be formed at two points or areas of the battery cell 420, for example to form a first polarity terminal 710 (e.g., a positive or anode terminal) and a second polarity terminal 715 (e.g., a negative or cathode terminal). The polarity terminals can be made from electrically conductive materials to carry electrical current from the battery cell 420 to an electrical load, such as a component or system of the electric vehicle 105.

For example, the battery cell 420 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 420 to separate the anode and cathode from each other and to facilitate transfer of lithium ions between the anode and cathode. It should be noted that battery cell 420 can also take the form of a solid state battery cell developed using solid electrodes and solid electrolytes. Solid electrodes or electrolytes can be or include inorganic solid electrolyte materials (e.g., oxides, sulfides, phosphides, and ceramics), solid polymer electrolyte materials, hybrid solid state electrolytes, or combinations thereof. In some embodiments, the solid electrolyte layer can include poly-anionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_2P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 420 can be included in battery modules 415 or battery packs 410 to power components of the electric vehicle 105. The battery cell housing 705 can be disposed in the battery module 415, the battery pack 410, or a battery array installed in the electric vehicle 105. The housing 705 can be of any shape, such as cylindrical with a circular (e.g., as depicted in FIG. 7, among others), elliptical, or ovular base, among others. The shape of the housing 705 can also be prismatic with a polygonal base, as shown in FIG. 8, among others. As shown in FIG. 9, among others, the housing 705 can include a pouch form factor. The housing 705 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 705 of the battery cell 420 can include one or more materials with various electrical conductivity or thermal conductivity, or a combination thereof. The electrically conductive and thermally conductive material for the housing 705 of the battery cell 420 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 705 of the battery cell 420 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 705 of the battery cell 420 is prismatic (e.g., as depicted in FIG. 8, among others) or cylindrical (e.g., as depicted in FIG. 7, among others), the housing 705 can include a rigid or semi-rigid material such that the housing 705 is rigid or semi-rigid (e.g., not easily deformed or manipulated into another shape or form factor). In examples where the housing 705 includes a pouch form factor (e.g., as depicted in FIG. 9, among others), the housing 705 can include a flexible, malleable, or non-rigid material such that the housing 705 can be bent, deformed, manipulated into another form factor or shape.

The battery cell 420 can include at least one anode layer 720, which can be disposed within the cavity 725 defined by the housing 705. The anode layer 720 can include a first redox potential. The anode layer 720 can receive electrical current into the battery cell 420 and output electrons during the operation of the battery cell 420 (e.g., charging or discharging of the battery cell 420). The anode layer 720 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg. Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 420 can include at least one cathode layer 730 (e.g., a composite cathode layer compound cathode layer, a compound cathode, a composite cathode, or a cathode). The cathode layer 730 can include a second redox potential that can be different than the first redox potential of the anode layer 720. The cathode layer 730 can be disposed within the cavity 725. The cathode layer 730 can output electrical current out from the battery cell 420 and can receive electrons during the discharging of the battery cell 420. The cathode layer 730 can also receive lithium ions during the discharging of the battery cell 420. Conversely, the cathode layer 730 can receive electrical current into the battery cell 420 and can output electrons during the charging of the battery cell 420. The cathode layer 730 can release lithium ions during the charging of the battery cell 420.

The battery cell 420 can include an electrolyte layer 735 disposed within the cavity 725. The electrolyte layer 735 can be arranged between the anode layer 720 and the cathode layer 730 to separate the anode layer 720 and the cathode layer 730. A separator can be wetted with a liquid electrolyte. The liquid electrolyte can be diffused into the anode layer 720. The liquid electrolyte can be diffused into the cathode layer 730. The electrolyte layer 735 can help transfer ions between the anode layer 720 and the cathode layer 730. The electrolyte layer 735 can transfer $Li^+$ cations from the anode layer 720 to the cathode layer 730 during the discharge operation of the battery cell 420. The electrolyte layer 735 can transfer lithium ions from the cathode layer 730 to the anode layer 720 during the charge operation of the battery cell 420.

The redox potential of layers (e.g., the first redox potential of the anode layer 720 or the second redox potential of the cathode layer 730) can vary based on a chemistry of the respective layer or a chemistry of the battery cell 420. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 730). Lithium-ion batteries can include a graphite chemistry, a silicon-graphite chemistry, or a lithium metal chemistry for the anode layer (e.g., the anode layer 720).

For example, lithium-ion batteries can include an olivine phosphate ($LiMPO_4$, M=Fe and/or Co and/or Mn and/or Ni)) chemistry, LISICON or NASICON Phosphates ($Li_3M_2$ $(PO_4)_3$ and $LiMPO_4O_x$, M=Ti, V, Mn, Cr, and Zr), for example Lithium iron phosphate (LFP), Lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 730). Lithium-ion batteries can include a graphite chemistry, a silicon-graphite chemistry, or a lithium metal chemistry for the anode layer (e.g., the anode layer 720). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 730) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 720) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, cascine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 735 can include or be made of a liquid electrolyte material. For example, the electrolyte layer 735 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 735 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 735 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr. La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_2P_3S_{11}$, $Li_2S$—$P_2S_5$, $Li_2S$—$B_2S_3$, SnS—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 735 includes a liquid electrolyte material, the electrolyte layer 735 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 735 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 735 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 735 from greater than 0 M to about 1.5 M.

Figure 10:
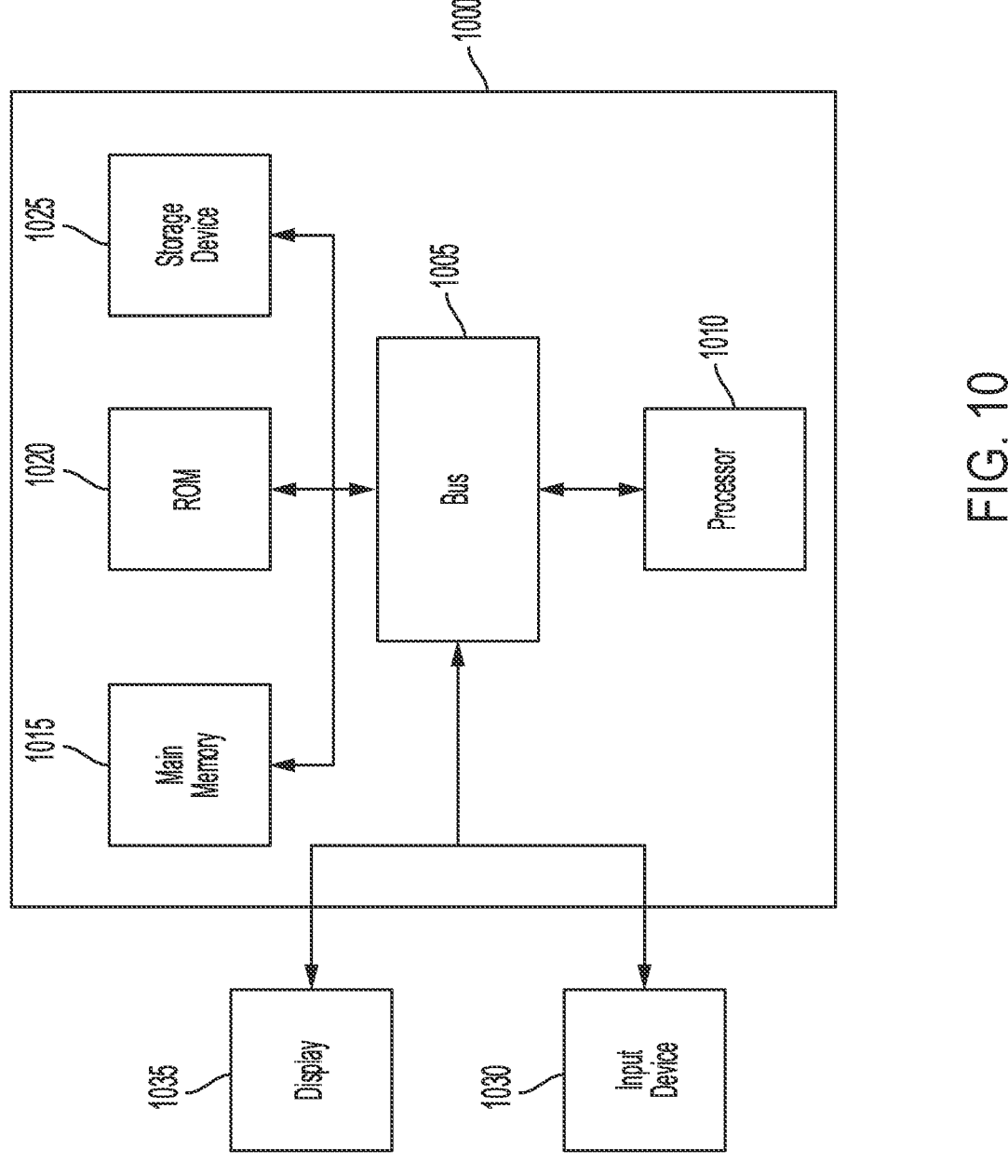
FIG. 10 is a block diagram illustrating an architecture for a computer system that can be employed to implement elements of the systems and methods described and illustrated herein.

FIG. 10 depicts an example block diagram of an example computer system 300. The computer system or computing device 300 can include or be used to implement a data processing system or its components. The computing system 300 includes at least one bus 1005 or other communication component for communicating information and at least one processor 1010 or processing circuit coupled to the bus 1005 for processing information. The computing system 300 can also include one or more processors 1010 or processing circuits coupled to the bus for processing information. The computing system 300 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 300 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 300 may be coupled via the bus 1005 to a display 1035, such as a liquid crystal display, or active matrix display, for displaying information to a user such as a driver of the electric vehicle 105 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 300 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 300 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

FIG. 11 depicts an example power transmission between an EV battery and an AC power system, in accordance with present implementations. At least one of the system 100 and the device 200 can perform method 1100. The method 1100 can couple a DC battery 315 of an EV 105 to a first DC circuit 140 with a capacitor 310. (Act. 1105.) For example, the method 1100 can include coupling a DC battery 315 of an electric vehicle 105 with a first DC circuit 140 including a capacitor 310. The method 1100 can charge a capacitor 310 to activate a second DC circuit 145. (Act. 1110.) For example, the method 1100 can include charging, in response to the coupling, the capacitor 310 to a capacitance satisfying a threshold of activation of a second DC circuit 144. The method 1100 can transmit DC power between a battery 315 of an EV 105 and a second DC circuit 145. (Act. 1115.) For example, the method 1100 can include transmitting, by the first DC circuit 140 in response to a determination that the capacitor 310 satisfies the threshold of activation of the second DC circuit 145, DC power between the battery 315 of the electric vehicle 105 and the second DC circuit 145. The method 1100 can include transmitting, from the battery 315 of the electric vehicle 105 to the second DC circuit 145, the DC power. The method 1100 can include a first DC circuit 140 having a first maximum voltage, the second DC circuit 145 having a second maximum voltage less than the first maximum voltage.

FIG. 12 depicts an example power transmission between an EV battery and an AC power system, in accordance with present implementations. At least one of the system 100 and the device 200 can perform method 1200.

The method 1200 can couple a DC battery of an EV to a first DC circuit with a capacitor. (Act 1205.) Act 1205 can correspond at least partially in one or more of structure and operation to act 1105. The method 1200 can charge a capacitor to activate a second DC circuit. (Act 1210.) Act 1210 can correspond at least partially in one or more of structure and operation to act 1110. At 1215, the method 1200 can transmit DC power between a battery of an EV and a second DC circuit. (Act 1215.) Act 1215 can correspond at least partially in one or more of structure and operation to act 1115.

The method 1200 can charge a second capacitor 305 to activate an AC circuit 150. (Act 1220.) For example, the method 1200 can include charging a second capacitor 305 to a second capacitance satisfying a threshold of activation of an alternating-current (AC) circuit 150, the second DC circuit 145 including the second capacitor 305. The method 1200 can convert DC power to AC power. (Act 1225.) For example, the method 1200 can include converting, in response to a determination that a second capacitor 305 has a capacitance satisfying a threshold of activation of an alternating-current (AC) circuit 150, the DC power to AC power. The method 1200 can transmit AC power between a battery 315 of an EV 105 and an AC circuit 150. (Act 1230.) For example, the method 1200 can include transmitting, to the AC circuit 150 in response to a determination that the second capacitor 305 satisfies the threshold of activation of the AC circuit 150, AC power corresponding to the DC power.

For example, the method 1200 can include charging, via a relay 380 coupling an alternating-current (AC) circuit 150 with the second DC circuit 145, a second capacitor 305 to a second capacitance satisfying a threshold of activation of the AC circuit 105, the second DC circuit 145 can include the second capacitor 305. For example, the method 1200 can include charging, in response to a determination that a voltage level of the second DC circuit 145 satisfies the threshold of activation of the second DC circuit 145, a second capacitor 305 to a capacitance satisfying a threshold of activation of an alternating-current (AC) circuit 150, the second DC circuit 145 can include the second capacitor 305. For example, the method 1200 can include charging, from a charger assistant circuit 360 having a voltage less than a second maximum voltage of an alternating-current (AC) circuit 150, a second capacitor 305 to a capacitance satisfying a threshold of activation of the AC circuit 150, the second DC circuit 145 can include the second capacitor 305. For example, the method can include transmitting, from the electric vehicle 105 to an alternating-current (AC) circuit 150 in response to receiving the DC power at the second DC circuit 145, AC power corresponding to the DC power.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a first direct-current circuit to couple with a direct-current battery of an electric vehicle;
a first capacitor of the first direct-current circuit configured to charge to a capacitance that satisfies a threshold of activation of a second direct-current circuit;
the first direct-current circuit to transmit, in response to a determination that the first capacitor satisfies the threshold of activation of the second direct-current circuit, direct-current power between the direct-current battery of the electric vehicle and the second direct-current circuit; and
a relay to couple an alternating-current circuit with the second direct-current circuit and to charge a second capacitor to a predetermined charge satisfying a threshold of activation of the alternating-current circuit, the second direct-current circuit including the second capacitor.

2. The system of claim 1, comprising:
the first direct-current circuit to transmit, from the direct-current battery of the electric vehicle to the second direct-current circuit, the direct-current power.

3. The system of claim 1, comprising:

the first direct-current circuit to cause the second direct-current circuit to transmit, from the electric vehicle to the alternating-current circuit in response to receiving the direct-current power at the second direct-current circuit, alternating-current power corresponding to the direct-current power.

4. The system of claim 1, comprising:

the first direct-current circuit to cause an inverter, coupling the second direct-current circuit and the alternating-current circuit, to convert, in response to determination that the second capacitor has a charge corresponding to the predetermined charge, the direct-current power to alternating-current power.

5. The system of claim 1, the first direct-current circuit having a first maximum voltage, and the second direct-current circuit having a second maximum voltage less than the first maximum voltage.

6. A method, comprising:

coupling a direct-current battery of an electric vehicle with a first direct-current circuit including a first capacitor;

charging, in response to coupling the direct-current battery with the first direct-current circuit, the first capacitor to a capacitance satisfying a threshold of activation of a second direct-current circuit;

transmitting, by the first direct-current circuit in response to a determination that the first capacitor satisfies the threshold of activation of the second direct-current circuit, direct-current power between the direct-current battery of the electric vehicle and the second direct-current circuit; and charging, from a charger assistant circuit having a voltage less than a maximum voltage of an alternating-current circuit, a second capacitor to a capacitance satisfying a threshold of activation of the alternating-current circuit, the second direct-current circuit including the second capacitor.

7. The method of claim 6, comprising:

transmitting, to the alternating-current circuit in response to determining that the second capacitor satisfies the threshold of activation of the alternating-current circuit, alternating-current power corresponding to the direct-current power.

8. The method of claim 6, comprising:

transmitting, from the direct-current battery of the electric vehicle to the second direct-current circuit, the direct-current power.

9. The method of claim 6, comprising:

transmitting, from the electric vehicle to the alternating-current circuit in response to receiving the direct-current power at the second direct-current circuit, alternating-current power corresponding to the direct-current power.

10. The method of claim 6, comprising:

converting, in response to determining that the second capacitor has the capacitance satisfying the threshold of activation of the alternating-current circuit, the direct-current power to alternating-current power.

11. The method of claim 6, the first direct-current circuit having a first maximum voltage, and the second direct-current circuit having a second maximum voltage less than the first maximum voltage.

12. A system, comprising:

a first direct-current circuit to couple with a direct-current battery of an electric vehicle;

a first capacitor of the first direct-current circuit configured to charge to a capacitance satisfying a first threshold of activation of a second direct-current circuit;

the first direct-current circuit to transmit, in response to a determination that the first capacitor satisfies the first threshold of activation, direct-current power from or to the direct-current battery of the electric vehicle;

the second direct-current circuit coupled with the first direct-current circuit and configured to transmit, in response to receiving the direct-current power, alternating-current power corresponding to the direct-current power from or to an alternating-current circuit;

a second capacitor of the second direct-current circuit configured to charge to a capacitance satisfying a second threshold of activation of the alternating-current circuit, the second direct-current circuit to transmit, to the alternating-current circuit in response to a determination that the second capacitor satisfies the second threshold of activation of the alternating-current circuit, the alternating-current power; and a relay to couple the alternating-current circuit with the second direct-current circuit, the relay configured to charge the second capacitor to the second threshold of activation.

13. A system, comprising:

a first direct-current circuit to couple with a direct-current battery of an electric vehicle;

a first capacitor of the first direct-current circuit configured to charge to a capacitance that satisfies a threshold of activation of a second direct-current circuit;

the first direct-current circuit to transmit, in response to a determination that the first capacitor satisfies the threshold of activation of the second direct-current circuit, direct-current power between the direct-current battery of the electric vehicle and the second direct-current circuit; and the first direct-current circuit to cause, from a charger assistant circuit having a voltage less than a maximum voltage of an alternating-current circuit, a second capacitor of the second direct-current circuit to charge to a capacitance satisfying a threshold of activation of the alternating-current circuit.

* * * * *